H. S. FOLGER.
HOLDER FOR RUBBER TYPE.
APPLICATION FILED OCT. 14, 1909.
963,365.  Patented July 5, 1910.
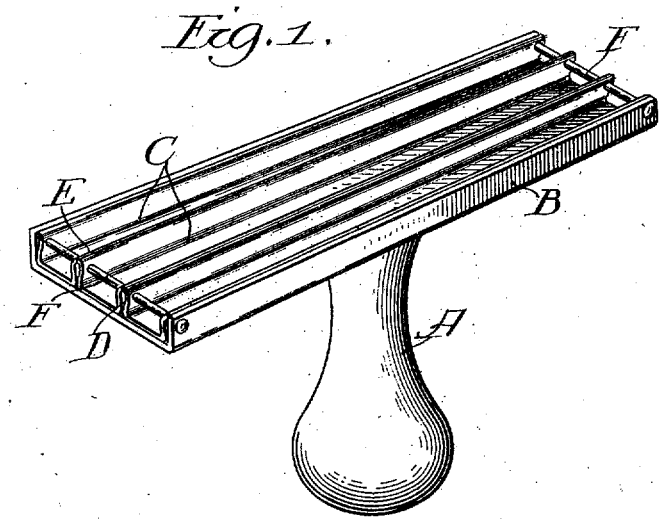
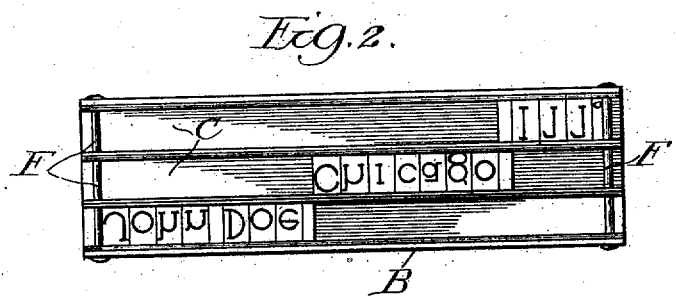
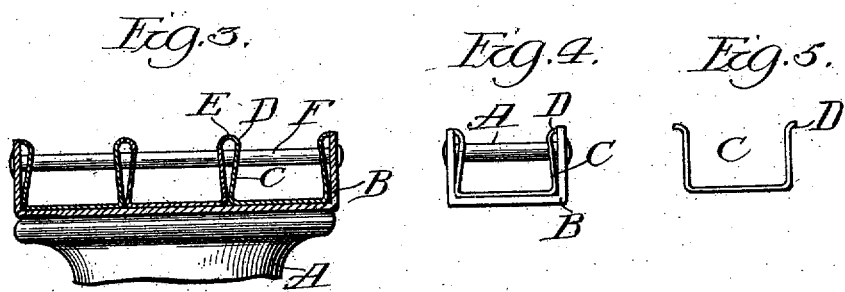
Witnesses
Inventor
Harry S. Folger
by Casper L. Redfield, Atty.

UNITED STATES PATENT OFFICE.

HARRY S. FOLGER, OF CHICAGO, ILLINOIS.

HOLDER FOR RUBBER TYPE.

963,365.      Specification of Letters Patent.      Patented July 5, 1910.

Application filed October 14, 1909. Serial No. 522,555.

*To all whom it may concern:*

Be it known that I, HARRY S. FOLGER, a citizen of the United States of America, and a resident of Chicago, county of Cook, and State of Illinois, have invented certain new and useful Improvements in Holders for Rubber Type, of which the following is a specification.

My invention relates to holders for rubber type and has for its object the construction of a superior form of such a holder and one in which the type will be held in a superior manner.

In the accompanying drawings—Figure 1 is a perspective view of the holder; Fig. 2 is a plan showing the rubber type held in position; Fig. 3 is an enlarged transverse section of the holder showing three type-holding channels; Fig. 4 is an end view of a similar type holder having only one channel, and Fig. 5 is a detached view of one of the channels in its original position before the sidewalls have been inclined so as to make a tapering channel for the holding of the rubber type.

In the said drawings, A is a handle, to which is secured a channel B of relatively rigid metal. In this channel are placed one or more channels C which are made of metal less rigid than the channel B, and the extreme edges of the channel C are bent upwardly as shown at D in Fig. 5. The width of the channels B is such that when the proper number of channels C are placed within the channel B, the sidewalls of the channel C will be pressed inward so as to incline those sidewalls by reason of the bent corner D coming into contact either with the sidewall of the channel B or with a similar projection D on the next adjacent channel C. When only one of the channels C is placed in a holding channel B, as shown in Fig. 4, the corners D engage the upper edges of the sidewalls of the rigid channel B and are compressed so that the sidewalls of channels C are inclined inwardly, as shown. The amount of inclination shown in the drawings is somewhat exaggerated for the purpose of illustration, but the incline is real. The manner of bending the extreme corner of the sidewall of the flexible or somewhat flexible channel C is such that the narrowest point across the open face of the channel is very close to the open edge of the channel.

The channels C may be secured within the channel B by any convenient means, as by brazing or riveting, but I have shown them held in place by bolts F, which run through the sidewalls of both channels B and channels C. As previously stated, the channel B is of metal sufficiently rigid to compress the walls of the channel C and hold them in the desired position by a tension on the walls of said flexible channels. When I put the bolts through, as shown, the walls of channel B may have a little less strength than is necessary, when the channels C are held in position by brazing or ordinary riveting or clenching to the bottom of the channel B. The reason for this is that the stiffness of the walls of the channel B is sufficient not only to overcome the spring tension put upon them by compressing the walls of the channel C, and also of sufficient strength to resist any strain produced by compressing the rubber type within the channels C. Another object in using the bolts F instead of securing the channel C in place by other means, is that said bolts when running through the ends of the channels serve to prevent the type located at or near the end of the channel from being tipped over or moved out of place accidentally in the handling of the stamp. I gain still another advantage in making my rubber type holder in this manner. By having the walls of the type holding channels C supported on each side, either by contact with the rigid walls B or by contact with the wall of an adjacent channel, the compression of rubber type within the channel C does not tend to spread those walls, and as a consequence I need to make the narrow space in the tapering channels only enough to produce a compression which will hold the type in place, and this compression will be no greater when one type is used than it will be when the channel is filled from end to end. On the other hand, if I make the type-holding channels C without the inside support, then I would have to make the walls of the channel C either with a greater incline than was necessary for holding one type, so that they would be sufficiently strong for holding a larger number of types, or else I would have to make the walls of the channels C themselves of sufficient rigidity to stand any strain liable to be put upon them. And again by placing these flexible channels of thin metal within a heavy channel and of sufficient rigidity, the corners of the flexible channels are not liable to distortion or displacement by accident.

What I claim is:—

1. In a holder for rubber type, a channel of rigid material, and a second channel of less rigid material secured within the first named channel, said second channel having its side walls straight except for the extreme upper edges thereof which upper edges engage the upper edges of the rigid channel and are forced inward thereby whereby the side walls of the second channel are uniformly inclined and securely held.

2. In a holder for rubber type, a channel of rigid material, and a series of channels of lighter and flexible material secured within the channel of rigid material, said lighter channels having their extreme upper edges bent outward so that the bent portion of one channel engages the bent portion of the next adjacent channel whereby the channels are made tapering by compressing the upper parts inward and such inwardly inclined walls are prevented from flexing outward by mutual support at the extreme upper edges.

Signed at Chicago, Ill., this 11th day of Oct. 1909.

HARRY S. FOLGER.

Witnesses:
WALTER H. REDFIELD,
JAMES J. FINNEY.